(12) United States Patent
Cheung et al.

(10) Patent No.: US 7,738,388 B2
(45) Date of Patent: Jun. 15, 2010

(54) OPERATIONAL STATUS TESTING APPARATUS AND METHOD FOR ETHERNET-BASED AUTOMATIC PROTECTION SWITCHING PROCESS

(75) Inventors: Tae Sik Cheung, Daejeon (KR); Byungjun Ahn, Daejeon (KR); Kyeong Ho Lee, Daejeon (KR); Hae Won Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 156 days.

(21) Appl. No.: 12/036,593

(22) Filed: Feb. 25, 2008

(65) Prior Publication Data

US 2008/0298260 A1 Dec. 4, 2008

(30) Foreign Application Priority Data

May 30, 2007 (KR) .................. 10-2007-0052934
Oct. 22, 2007 (KR) .................. 10-2007-0106212

(51) Int. Cl.
*H04L 12/26* (2006.01)

(52) U.S. Cl. ....................... 370/248; 370/222

(58) Field of Classification Search .......... 370/216, 370/222, 228, 389; 455/67.11
See application file for complete search history.

(56) References Cited

U.S. PATENT DOCUMENTS 6,614,753 B2 9/2003 Ikawa et al.

(Continued)

FOREIGN PATENT DOCUMENTS

KR 1020010019053 3/2001

(Continued)

OTHER PUBLICATIONS

Korean Notice of Allowance for Application No. 9-5-2009-052780412, dated Dec. 23, 2009.

*Primary Examiner*—Albert T Chou
(74) *Attorney, Agent, or Firm*—Lahive & Cockfield, LLP; EuiHoon Lee, Esq.

(57) ABSTRACT

Provided is an operational status testing apparatus and method for an Ethernet-based APS process. A test command signal which contains a command to perform an operational test for the APS process of a first node and a second test response signal that indicates that the operation of the APS process of a second node is performed normally, from among far end request signals that are received from the second node connected to own first node via an Ethernet network, are filtered. When the far end request signals are test command signals, a first test response signal that indicates that the operation of the APS process of the first node is performed normally is generated, and a top priority local request signal is selected based on priorities of the first test response signal and at least one local request signal that indicates the status of the APS process of the first node, and an output signal to be transmitted to the second node is determined based on priorities of the top priority local request signal and the filtered the far end request signal. The function for testing the operational status for the APS process defined in ITU-T recommendation G.8031 is embodied, and when an operational status test request is received from another node, the APS process can be tested effectively without having to perform a complicated diagnosis operation for the APS process.

20 Claims, 4 Drawing Sheets

U.S. PATENT DOCUMENTS

| | | |
|---|---|---|
| 7,102,995 B2 | 9/2006 | Gonda |
| 2002/0080724 A1 | 6/2002 | Nham |
| 2004/0132409 A1* | 7/2004 | Arnold et al. ............ 455/67.11 |
| 2005/0169187 A1 | 8/2005 | Taylor et al. |
| 2007/0076590 A1* | 4/2007 | Galpin et al. ............... 370/216 |
| 2007/0133398 A1* | 6/2007 | Zhai ........................... 370/228 |
| 2008/0279181 A1* | 11/2008 | Shake et al. ................ 370/389 |

FOREIGN PATENT DOCUMENTS

| | | |
|---|---|---|
| KR | 1020010064428 | 7/2001 |

* cited by examiner

| REQUEST/STATUS | PRIORITY | REQUEST/STATUS | PRIORITY |
|---|---|---|---|
| LOCKOUT OF PROTECTION (LO) | 15 | WAIT TO RESTORE (WTR) | 5 |
| SIGNAL FAIL FOR PROTECTION (SF-P) | 14 | EXERCISE (EXER) | 4 |
| FORCED SWITCH (FS) | 13 | REVERSE REQUEST (RR) | 2 |
| SIGNAL FAIL FOR WORKING (SF) | 11 | DO NOT REVERT (DNR) | 1 |
| SIGNAL DEGRADE (SD) | 9 | NO REQUEST (NR) | 0 |
| MANUAL SWITCH (MS) | 7 | * PRIORITIES 3, 6, 8, 10, AND 12 WILL BE DEFINED LATER | |

OPERATIONAL STATUS TESTING APPARATUS AND METHOD FOR ETHERNET-BASED AUTOMATIC PROTECTION SWITCHING PROCESS

CROSS-REFERENCE TO RELATED PATENT APPLICATIONS

This application claims the benefit of Korean Patent Application No. 10-2007-0052934, filed on May 30, 2007, and Korean Patent Application No. 10-2007-0106212, filed on Oct. 22, 2007, in the Korean Intellectual Property Office, the disclosure of which is incorporated herein in its entirety by reference.

BACKGROUND OF THE INVENTION

1. Field of the Invention

The present invention relates to an operational status testing apparatus and a method for an Ethernet-based automatic protection switching (APS) process, and more particularly, to an operational status testing apparatus and a method for an Ethernet-based APS process, in which an operational status testing function and a protection switching status maintaining function of an APS process stipulated by ITU-T recommendation G.8031 are made to complement each other and are improved.

This work was supported by the IT R&D program of MIC/IITA [2006-S-061-02, R&D on Router Technology for IPv6 based QoS Services and Host Mobility].

2. Description of the Related Art

Protection switching (PS) allows at least one reliable connection path to be formed between two nodes connected via a network and, when a failure occurs in the connection path, communication can be achieved by using a previously reserved protection connection path.

An Ethernet protection switching function is defined by ITU-T recommendations G.8031 and G.8032. Here, ITU-T recommendation G.8031 defines a protection switching method for an Ethernet point-to-point connection, and ITU-T recommendation G.8032 defines a protection switching method for an Ethernet ring connection. The present invention relates to a function for testing whether a protection switching function is performed normally between both nodes connected via an Ethernet regardless of a method for connecting both nodes connected via the Ethernet. However, since ITU-T recommendation G.8032 has not been recognized as an official recommendation yet, only Ethernet linear protection switching stipulated by ITU-T recommendation G.8031 will now be described.

ITU-T recommendation G.8031 stipulates a 1-phase APS process in a 1:1 or 1+1 configured linear connection network architecture. Nodes at both ends of a protection domain are connected to each other via two paths, which are called a working transmission path and a protection transmission path, respectively. The working transmission path is a path through which data is interchanged between both ends of the protection domain at normal times and the protection transmission path is a reserved path for the case where a failure occurs in the working transmission path. An APS process is used in nodes at both ends of the protection domain so as to interchange path status information and a protection switching command.

The APS process is very important when a function for managing a protection switching operation is performed. If the APS process is stopped or a malfunction occurs at either end of the protection domain, a transmission path between both ends of the protection domain may be intercepted.

In order to prevent this situation, ITU-T recommendation G.8031 defines a test command (hereinafter, referred to as an EXER request) to check whether another node's APS process is performed normally at both ends of the protection domain. In other words, two nodes are located at both ends of the protection domain and connected each other. One node transmits the EXER request to the other node if necessary, and the other node who has received the EXER request checks its own APS process. If it is checked whether the APS process is performed normally, the other node makes a previously defined response, thereby indicating the operational status of the other node's APS process.

ITU-T recommendation G.8031 which has been published in 2006 defines NR (No Request) or DNR (Do Not Revert) in response to the EXER request. However, since NR or DNR may be confused with a response that is normally received from another node, NR or DNR is being modified by defining a new response that is called RR (Reverse Request) so that RR can be distinguished from other responses.

However, such a modification conflicts with the operation of the conventional APS process because the priority of a response to the EXER request becomes high.

Figure 1:
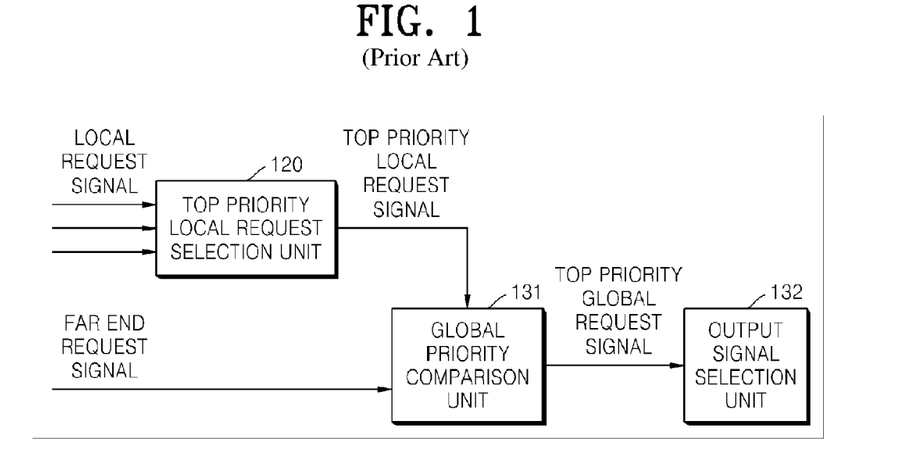
FIG. 1 illustrates a configuration of a conventional signal processing apparatus for an APS process.

In the conventional APS process, the priority of a status or request of a node of APS process own (hereinafter, referred to as a local request) is compared with the priority of a status or request that is received from another node at a far end of the protection domain (hereinafter, referred to as a far end request) and whichever request has the higher priority is considered as a final request (hereinafter, referred to as a global request), as illustrated in FIG. 1.

For example, both ends of the protection domain are set in a non-revertive mode, and a failure occurs in the working transmission path, and the data transmission path is changed to the protection transmission path, and the failure in the working transmission path is being recovered. If the switched state is maintained, a DNR request is transmitted to another node at a far end of the protection domain, even though the working transmission path is being recovered. In this situation, if one node transmits the EXER request the other node at the far end of the protection domain, the other node checks its own APS process and sends a RR response. Then, the EXER request is revoked and the DNR request is returned, and the other node also revokes the RR response and must also send the DNR request.

Figure 2:
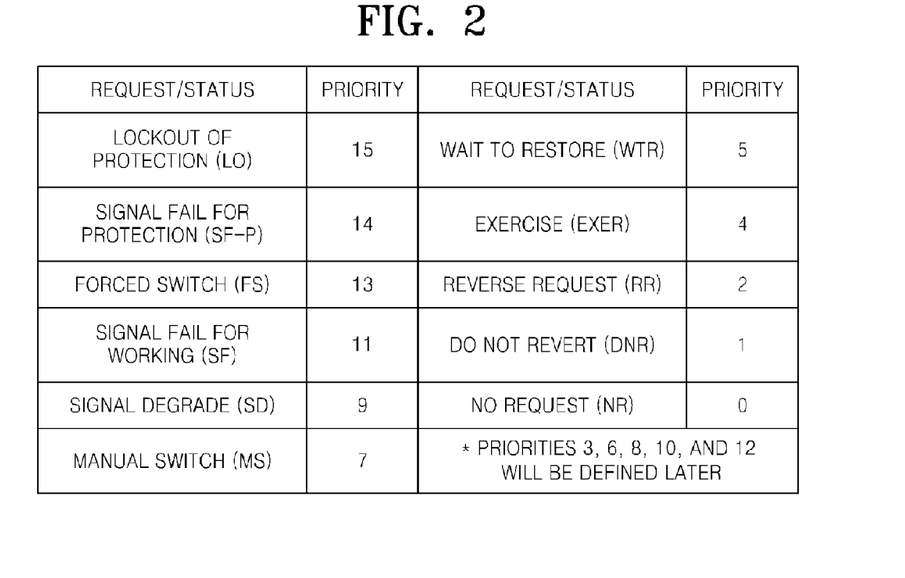
FIG. 2 illustrates priorities of signals that indicate requests and statuses of an APS process defined in ITU-T recommendation G.8031.

However, as illustrated in FIG. 2 which relates to priorities of each request and status defined in ITU-T recommendation G.8031, since the priority of RR is higher than that of DNR, it is not possible that the RR response is revoked and returned to the DNR request.

SUMMARY OF THE INVENTION

The present invention provides an operational status testing apparatus and method for an Ethernet-based APS process in which an operational status testing function and a protection switching status maintaining function of an APS process stipulated by ITU-T recommendation G.8031 are made to complement each other and are improved.

According to an aspect of the present invention, there is provided an operational status testing apparatus for an APS process, the apparatus comprising: a received signal filtering unit filtering a test command signal which contains a command to perform an operational test for the APS process of a first node and filtering a second test response signal that indicates that the operation of the APS process of a second node connected to first node via an Ethernet network is performed normally, from among far end request signals that are received from the second node and when the far end request signals are test command signals, generating a first test response signal that indicates that the operation of the APS process of the first node is performed normally; a top priority local request selection unit selecting a top priority local request signal based on priorities of the first test response signal and at least one local request signal that indicates the status of the APS process of the first node; and an output signal determination unit determining an output signal to be transmitted to the second node based on priorities of the top priority local request signal and the filtered far end request signal.

According to another aspect of the present invention, there is provided an operational status testing method for an APS process, the method comprising: filtering a test command signal which contains a command to perform an operational test for the APS process of a first node and filtering a second test response signal that indicates that the operation of the APS process of a second node connected to own first node via an Ethernet network is performed normally, from among far end request signals that are received from the second node; when the far end request signals are test command signals, generating a first test response signal that indicates that the operation of the APS process of the first node is performed normally; selecting a top priority local request signal based on priorities of the first test response signal and at least one local request signal that indicates the status of the APS process of the first node; and determining an output signal to be transmitted to the second node based on priorities of the top priority local request signal and the filtered far end request signal.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The following just illustrates the principle of the invention. Therefore, although not clearly described or not shown, one or ordinary skill in the art would be able to devise various apparatuses which embody the principle of the invention and are according to the concept and scope of the invention. In addition, it should be understood that all conditional terms and embodiments listed in the specification are, in principle, clearly intended only for the purpose of understanding the concept of the invention and are not limited to the specifically-listed embodiments and statuses. In addition, the principle, viewpoint, and embodiments of the present invention and all detailed descriptions of specific embodiments should be understood to be intended to include the structural and functional equivalents of the matter. In addition, these equivalents should be understood to include currently, well-known equivalents and equivalents to be developed in future, i.e., all elements that are invented to perform the same function regardless of structures.

Thus, the functions of various elements shown in the drawings including a processor or functional blocks indicated in a similar concept to the processor may be provided by using dedicated hardware and hardware having the capability for executing software related to appropriate software. When the functions of various elements are provided by the processor, the functions may be provided by a single dedicated processor, a single shared processor or a plurality of separate processors, and part of them may be shared. In addition, use of a processor, control or a term represented as a similar concept to control should not be construed by exclusively referring to hardware having the capability of executing software and should be understood to implicitly include digital signal processor (DSP) hardware, read-only memory (ROM) for storing software, random-access memory (RAM), and non-volatile memory without limitations. Other well-known, commonly-used hardware may be included.

The above-mentioned objectives, features, and advantages will be more clarified throughout the following description related to the attached drawings. When describing the invention, when it is determined that a specific description of a related well-known configuration or function may make the key point of the invention unclear, a detailed description thereof will be omitted. The present invention will now be described more fully with reference to the accompanying drawings, in which exemplary embodiments of the invention are shown.

FIG. 1 illustrates a configuration of a conventional signal processing apparatus for an APS process, and FIG. 2 illustrates priorities of signals that indicate requests and statuses of an APS process defined in ITU-T recommendation G.8031.

Referring to FIG. 1, the conventional signal processing apparatus for an APS includes a top priority local request selection unit 120, a global priority comparison unit 131, and an output signal selection unit 132.

The top priority local request selection unit 120 receives a plurality of local request signals and selects a local request signal, which has a highest priority, from among the local request signals as a top priority local request signal.

The global priority comparison unit 131 compares the priority of a far end request signal that is received from another node at a far end of the protection domain, with the priority of a top priority local request signal that is output from the top priority local request selection unit 120, and selects a request signal, which has a highest priority, thereby outputting a top priority global request signal.

The top priority local request signal that is output from the top priority local request selection unit 120 and the top priority global request signal that is output by the global priority comparison unit 131 are input to the output signal selection unit 132. If the top priority global request signal is the same as the top priority local request signal, the output signal selection unit 132 selects the top priority global request signal as an output local request signal to be transmitted to the other node, and if the top priority global request signal is the same as the received far end request signal, the output signal selection unit 132 selects an NR (No Request) signal that indicates no request.

Figure 3:
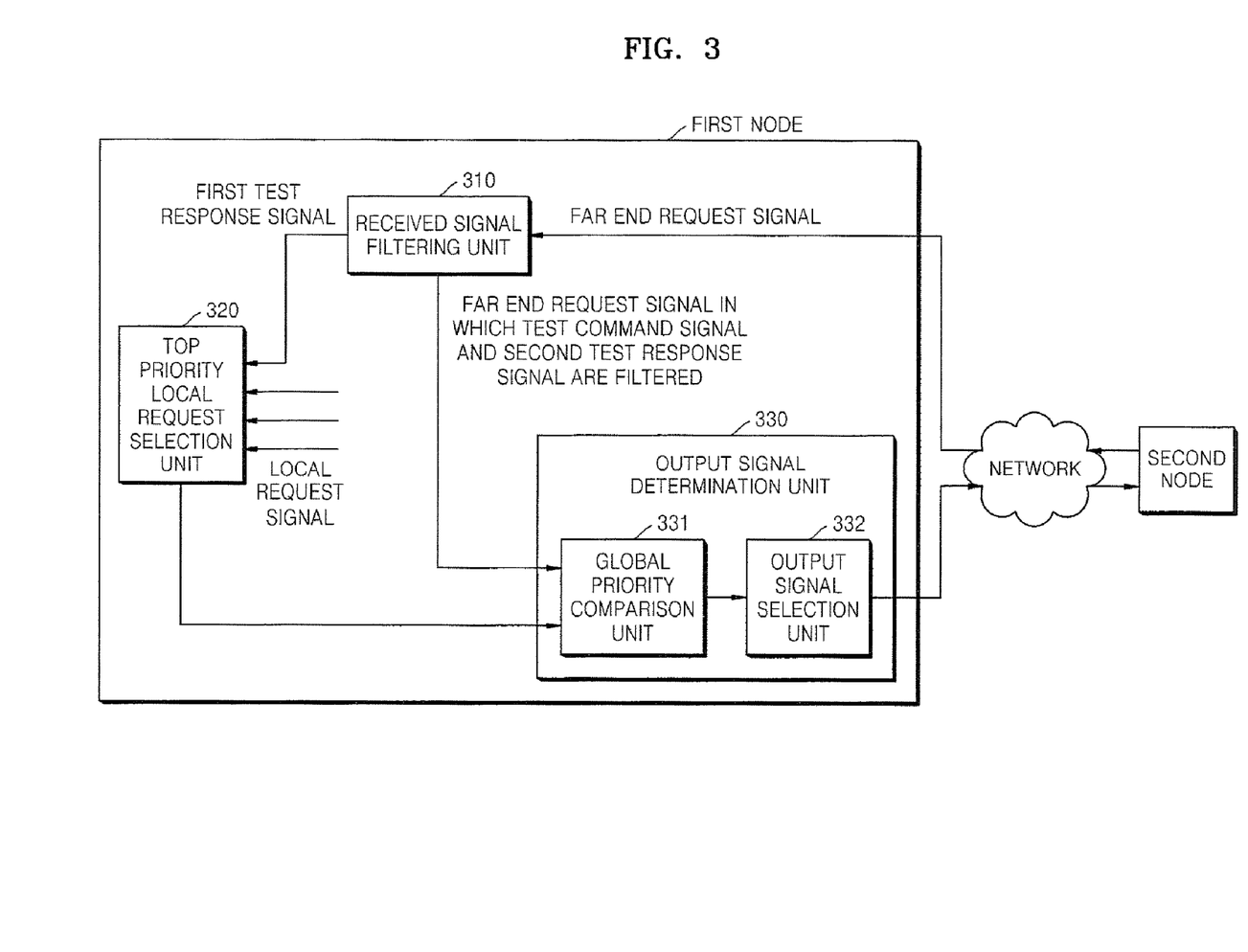
FIG. 3 illustrates a configuration of an operational status testing apparatus for an APS process according to an embodiment of the present invention.
Figure 4:
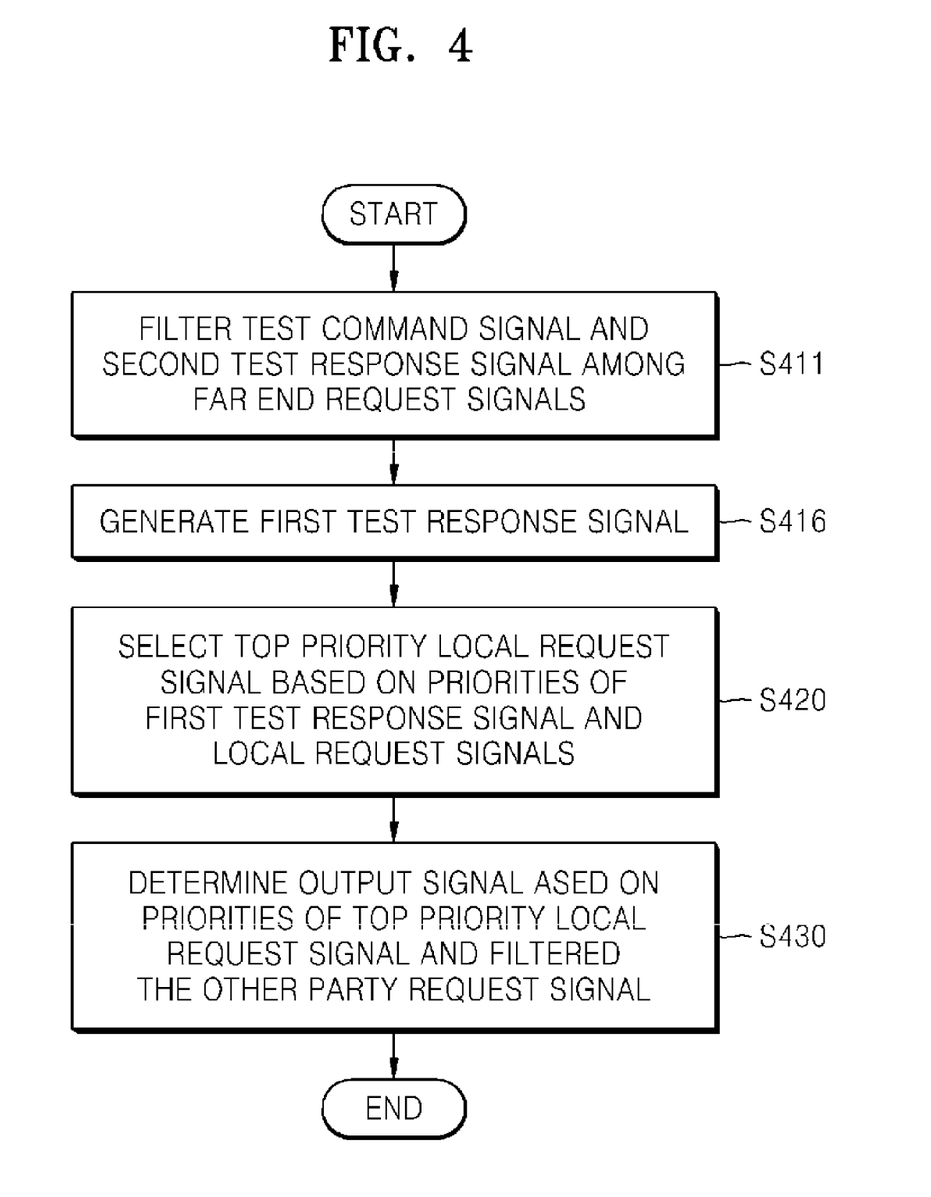
FIG. 4 is a flowchart illustrating an operational status testing method for an APS process according to an embodiment of the present invention.

FIG. 3 illustrates configuration of an operational status testing apparatus for an APS process according to an embodiment of the present invention, and FIG. 4 is a flowchart illustrating an operational status method for an APS process according to an embodiment of the present invention.

Referring to FIG. 3, the operational status testing apparatus for an APS process according to an embodiment of the present invention includes a received signal filtering unit 310, a top priority local request selection unit 320, and an output signal determination unit 330.

The received signal filtering unit 310 filters a test command signal which contains a command to perform an operational test for the APS process of a first node and filters a second test response signal that indicates that the operation of the APS process of a second node connected to the first node via an Ethernet network is performed normally, from among the far end request signals that are received from the second node (S411), and when the far end request signal include the test command signal, the received signal filtering unit 310 generates a first test response signal that indicates that the operation of the APS process of the first node is performed normally (S416).

According to ITU-T recommendation G.8031, the test command signal that indicates that a command for an operational test of the APS process of the first node is an EXER signal and the first and the second test response signal is a RR signal.

Figure 5:
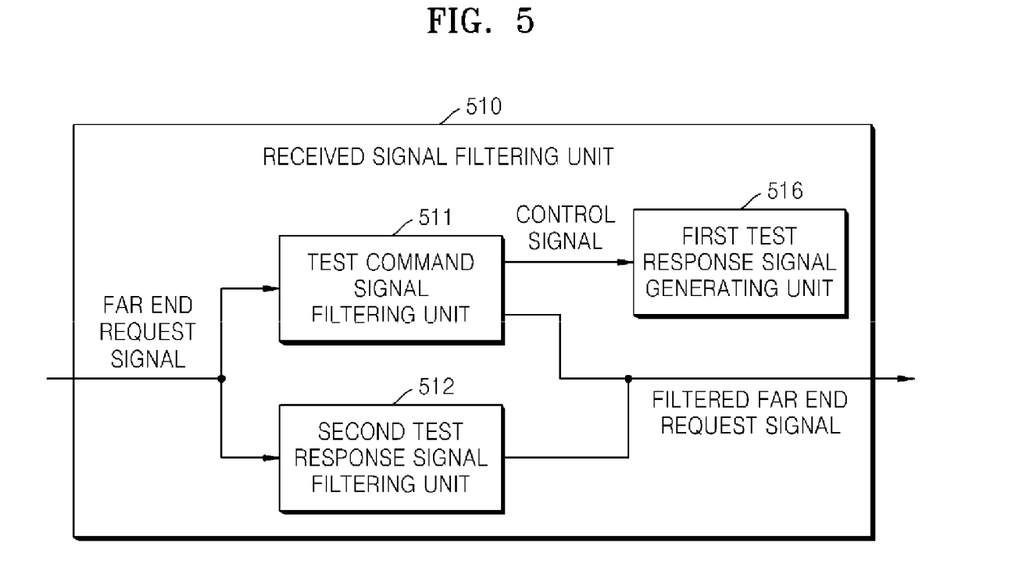
FIG. 5 illustrates a configuration of a received signal filtering unit of the operational status testing apparatus for an APS process according to an embodiment of the present invention.

FIG. 5 illustrates a configuration of the received signal filtering unit 310 shown in FIG. 3 according to an embodiment of the present invention.

Referring to FIG. 5, a received signal filtering unit 510 according to an embodiment of the present invention includes a test command signal filtering unit 511, a second test response signal filtering unit 512, and a first test response signal generating unit 516.

The test command signal filtering unit 511 filters a test command signal that contains a command to perform an operational test of the APS process of the first node, from among the far end request signals that are received from the second node.

The second test response signal filtering unit 512 filters a second test response signal that contains a command to perform an operational test of the APS process of the second node, from among the far end request signals that are received from the second node.

When the far end request signals include the test command signal, the first test response signal generating unit 516 generates a first test response signal that indicates the operation of the APS process of the first node is performed normally. In this case, the test command filtering unit 511 may send a control signal that instructs the first test response signal generating unit 516 to generate the first test response signal.

The top priority local request selection unit 320 selects a top priority local request signal based on the priority of the first test response signal generated by the first test response signal generating unit 516 and priorities of at least one local request signal that indicates the status of the APS process of the first node (S420).

In other words, the top priority local request selection unit 320 compares the priority of the first test response signal with priorities of at least one local request signal, thereby selecting a signal, which has the highest priority, as a top priority local request signal.

The output signal determination unit 330 includes a global priority comparison unit 331 and an output signal selection unit 332.

The global priority comparison unit 331 compares priorities of the far end request signals filtered by the received signal filtering unit 310 with the priority of the top priority local request signals selected by the top priority local request selection unit 320, thereby selecting a signal, which has the highest priority, as a top priority global request signal.

When the top priority global request signal is the same as the top priority local request signal, the output signal selection unit 332 selects the top priority global request signal as an output signal, and when the top priority global request signal is not the same as the top priority local request signal, the output signal selection unit 332 selects an NR signal as an output signal.

In an exemplary embodiment, it is assumed that both ends of a protection domain are set in a 1:1 bidirectional, non-revertive mode, a failure occurs in a working transmission path and is recovered when traffic is interchanged by using a protection transmission path between both ends of the protection domain.

The operational status testing apparatus and method for the APS process according to the present application may be used in other embodiment than the above-described exemplary embodiment regardless of a 1:1/1+1 configured linear connection network architecture, restoration/non-restoration, and uni-direction/bi-direction.

In the above-described exemplary embodiment, at both ends of the protection domain, respectively a DNR (Do Not Revert) signal is transmitted to the other node in the far end of the protection domain so as to maintain a previously formed protection switching status.

At this time, in order to test an operational status of the APS process of the first node, the EXER signal is input to the APS process as one local request signal at the first node. If the EXER signal is input to the top priority local request selection unit 320, since the priority of the EXER signal is higher than the priority of the DNR signal which is an existing local request signal, the EXER signal is selected as a top priority local request signal. In addition, since the far end request signal is also the DNR signal, the EXER signal is determined as an output signal by the output signal determination unit 330 so that the EXER signal is transmitted to the first. node.

A signal processing operation at the first node which receives the EXER signal will now be described.

The received signal filtering unit 310 filters the EXER signal from the far end request signals, generates an RR signal (a first test response signal) as a response to the EXER signal, and provides one of a plurality of local request signals to the top priority local request selection unit 320.

Since a signal which has the highest priority among local request signals that are input to the top priority local request selection unit 320 is a DNR signal, if the RR signal (the first test response signal) is input from the received signal filtering unit 310, a top priority local request signal is the RR signal (the first test response signal).

Since the EXER signal is filtered by the received signal filtering unit 310, the NR signal is input to the global priority comparison unit 331 as the far end request signal. Since the priority of the NR signal is lower than the priority of the RR signal that is selected as a top priority local request signal, the output signal selection unit 332 selects the RR signal (the first test response signal) as an output signal.

In this way, the RR signal (the first test response signal) that is generated by the second test response signal filtering unit 512 inside the received signal filtering unit 310 is treated the same as other local request signals and is transmitted to the second node through all operations of the APS process of the first node.

When the EXER signal is received as a test command signal from a second node at a far end of the protection domain, one APS process diagnosis operation may be performed. In the APS process diagnosis operation, the RR signal (the first test response signal) generated by the second test response signal filtering unit 512 is transmitted to the second node as an output signal without investigating the operational status of the APS process through a complicated diagnosis operation. Thus, in the operational status testing apparatus and method for the APS, the status of the APS process is known effectively without having to perform an additional test procedure for an operational status and a proper response can be provided to the second node.

The other node (a node to which the EXER signal is transmitted), in which the proper response is received, filters the RR signal (a second test response signal in the other node's view) that is received by the received signal filtering unit 310, and transmits the received RR signal (a second test response signal) to an upper process in order to notify a user that the operational status of the APS process is normal.

Here, the upper process may be a management program that operates in network equipment or a command line interface (CLI) with which an operator interchanges a command directly.

The test command for the APS process of another node at a far end of the protection domain is revoked as described below.

If the EXER signal that has been a top priority local request signal from among a plurality of local request signals is revoked, a local request signal having a high priority among the other local request signals, i.e., the DNR signal is selected as a top priority local request signal by the top priority local request selection unit 320.

When the received signal filtering unit 310 has already received the RR signal in response to a test command from the other node, it filters the RR signal (a second test response signal) from the far end request signals so that the NR signal is input to the global priority comparison unit 331 as the far end request signal.

The global priority comparison unit 331 compares the priority of the DNR signal which is a top priority local request signal selected by the top priority local request selection unit 320 with the priority of the NR signal that is the far end request signal filtered by the received signal filtering unit 310 and selects the DNR signal which has the highest priority as a top priority global request signal so that the output signal selection unit 332 selects the DNR signal as an output signal.

At this time, at the other node, the DNR signal passes through the received signal filtering unit 310 and reaches the global priority comparison unit 332, and the received signal filtering unit 310 does not receive the EXER signal. Thus, the RR signal (the first test response signal) is not provided to the top priority local request selection unit 320 any more.

Thus, the top priority local request selection unit 320 selects the DNR signal, which is a local request signal having the highest priority among existing local request signals, as a top priority local request signal. The global priority comparison unit 331 selects the DNR signal in response to a top priority global request, and the output signal selection unit 332 selects the DNR signal as an output signal.

As a result, if the EXER command is revoked, nodes at both ends of the protection domain are returned to an initial status, i.e., the status in which the DNR signals are interchanged.

The concept of signal processing of a test command signal and a DNR signal according to an embodiment of the present invention can be utilized in the case where a specific response that does not comply with the operational principle of other existing APS processes is necessary, except for the test command signal and the DNR signal.

In other words, when a request signal requiring a specific response that does not comply with the operational principle of an existing APS process is received from another node at a far end of the protection domain, the received request signal is filtered and is separately processed, a response signal to the received request signal is generated and is processed as a local request so that the concept of signal processing of a test command signal according to an embodiment of the present invention can be applied.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, a font ROM data structure according to the present invention can also be embodied as computer readable codes on a computer readable recording medium such as ROM, RAM, CD-ROMs, magnetic tapes, floppy disks, flash memories, and optical data storage devices.

According to the present invention, when the operation of a conventional APS process contradicts a standard protocol stipulated by ITU-T recommendation, like a test command signal, such contradiction is adjusted so that, even when the test command signal is used, the APS process can be performed normally.

According to the operational status testing apparatus and the method for an Ethernet-based APS process, the function for testing the operational status for the APS process defined in ITU-T recommendation G.8031 can be embodied, and the APS process can be tested effectively without having to perform a complicated diagnosis operation for the APS process and a proper response can be provided to the other party.

While this invention has been particularly shown and described with reference to exemplary embodiments thereof, it will be understood by those of ordinary skill in the art that various changes in form and details may be made therein without departing from the spirit and scope of the invention as defined by the appended claims. Therefore, the scope of the invention is defined only by the appended claims, and all differences within the scope will be construed as being included in the present invention.

What is claimed is:

1. An operational status testing apparatus for an APS process performed in a processor of a first node for interchanging path status information and a protection switching command with an APS process of a second node which is connected to the first node via an Ethernet network, the apparatus comprising:

an APS processing unit operating the APS process of the first node in the processor of the first node;

a received signal filtering unit filtering a test command signal which contains a command to perform an operational test for the APS process of the first node and filtering a second test response signal that indicates that the operation of the APS process of the second node is performed normally, from among far end request signals that are received from the second node and when the far end request signals are test command signals, generating a first test response signal that indicates that the operation of the APS process of the first node is performed normally;

a top priority local request selection unit selecting a top priority local request signal based on priorities of the first test response signal and at least one local request signal that indicates the status of the APS process of the first node; and an output signal determination unit determining an output signal to be transmitted to the second node based on priorities of the top priority local request signal and the filtered far end request signal.

2. The apparatus of claim 1, wherein the test command signal is an EXER signal.

3. The apparatus of claim 1, wherein the first test response signal and the second test response signal are RR signals.

4. The apparatus of claim 1, wherein the priorities are defined in ITU-T recommendation G.8031.

5. The apparatus of claim 1, wherein the received signal filtering unit comprises:

a test command signal filtering unit filtering the test command signal from among the far end request signals;

a second test response signal filtering unit filtering the second test response signal from among the far end request signals; and a first test response signal generating unit generating the first test response signal when the far end request signal is the test command signal.

6. The apparatus of claim 1, wherein the top priority local request selection unit compares priorities of the first test response signal and the at least one local request signal and selects a top priority request signal which has a highest priority.

7. The apparatus of claim 1, wherein the output signal determination unit comprises:

a global priority comparison unit comparing priorities of the filtered far end request signal and the selected top priority local request signal and selecting a top priority global request signal which has a highest priority; and an output signal selection unit selecting the top priority global request signal as the output signal when the top priority global request signal is the same as the top priority local request signal, and when the top priority global request signal is not the same as the top priority local request signal, selecting an NR signal as the output signal.

8. The apparatus of claim 1, wherein, when the far end request signal is a second test response signal, the received signal filtering unit transmits the far end request signal to an upper process of the APS process of the first node.

9. The apparatus of claim 8, wherein the upper process is a command line interface (CLI) with which an operator can input a command directly.

10. The apparatus of claim 8, wherein the upper process is a management program in network equipment.

11. An operational status testing method for an APS process performed in a processor of a first node for interchanging path status information and a protection switching command with an APS process of a second node which is connected to the first node via an Ethernet network, the method comprising:

operating the APS process of the first node in the processor of the first node;

filtering a test command signal which contains a command to perform an operational test for the APS process of the first node and filtering a second test response signal that indicates that the operation of the APS process of the second node is performed normally, from among far end request signals that are received from the second node;

when the far end request signals are test command signals, generating a first test response signal that indicates that the operation of the APS process of the first node is performed normally;

selecting a top priority local request signal based on priorities of the first test response signal and at least one local request signal that indicates the status of the APS process of the first node; and determining an output signal to be transmitted to the second node based on priorities of the top priority local request signal and the filtered far end request signal.

12. The method of claim 11, wherein the test command signal is an EXER signal.

13. The method of claim 11, wherein the first test response signal and the second test response signal are RR signals.

14. The method of claim 11, wherein the priorities are defined in ITU-T recommendation G.8031.

15. The method of claim 11, wherein the filtering of the received signal comprises:

filtering the test command signal from among the far end request signals; and filtering the second test response signal from among the far end request signals.

16. The method of claim 11, wherein the selecting of the top priority local request signal comprises comparing priorities of the first test response signal and the at least one local request signal and selecting a top priority request signal which has a highest priority.

17. The method of claim 11, wherein the determining of the output signal comprises:

comparing priorities of the filtered far end request signal and the selected top priority local request signal and selecting a top priority global request signal which has a highest priority; and when the top priority global request signal is the same as the top priority local request signal, selecting the top priority global request signal as the output signal, and when the top priority global request signal is not the same as the top priority local request signal, selecting an NR signal as the output signal.

18. The method of claim 11, when the far end request signal is a second test response signal, further comprising transmitting the far end request signal to an upper process of the APS process of the first node.

19. The method of claim 18, wherein the upper process is a command line interface (CLI) with which an operator can input a command directly.

20. The method of claim 18, wherein the upper process is a management program in network equipment.

* * * * *